(12) United States Patent
Goto

(10) Patent No.: US 6,341,872 B1
(45) Date of Patent: Jan. 29, 2002

(54) ELECTRONIC PROVIDED WITH NON-LIGHT EMITTING DISPLAY DEVICE, LIGHT GUIDE PLATE AND LIGHTING DEVICE USED FOR SAME

(75) Inventor: Youichiro Goto, Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/645,873

(22) Filed: Aug. 25, 2000

(30) Foreign Application Priority Data

Aug. 25, 2000 (JP) .......................................... 11-238412

(51) Int. Cl.[7] ................................................. F21V 8/00
(52) U.S. Cl. .......................... 362/31; 362/331; 385/901; 385/37
(58) Field of Search .......................... 362/26, 31, 330, 362/27, 489; 349/63, 64, 65; 385/901, 37; 40/559, 560, 561, 562, 453

(56) References Cited

FOREIGN PATENT DOCUMENTS

JP          408094844       *    4/1996

OTHER PUBLICATIONS

Abstract of Japanese Patent Publ. No. 10153777; dated Jun. 9, 1998.
Abstract of Japanese Patent Publ. No. 10311915; dated Nov. 24, 1998.

* cited by examiner

*Primary Examiner*—Alan Cariaso
*Assistant Examiner*—Hargobind S. Sawhney
(74) *Attorney, Agent, or Firm*—Arent Fox Kintner Plotkin & Kahn, PLLC

(57) ABSTRACT

An electronic is provided with a reflection type liquid crystal display device having a front light and shows good display performance capable of using practically by suppressing parallax on a display to be observed. A first inclining surface (11) inclining to an incident surface (8) and a second inclining surface (12) inclining to an opposite surface (13) to the incident surface (8) are alternately formed on an opposite surface (10) of a light guide plate (5). A peak line (12a) and a valley line (11a) parallel to each other are formed by the first inclining surfaces (11) and the second inclining surface (12). The second inclining surface (12) for forming the valley line with the first inclining surfaces (11) is positioned on an upper side of the body 1 of the electronic.

5 Claims, 7 Drawing Sheets

ELECTRONIC PROVIDED WITH NON-LIGHT EMITTING DISPLAY DEVICE, LIGHT GUIDE PLATE AND LIGHTING DEVICE USED FOR SAME

BACKGROUND OF THE INVENTION

1. Field of the Invention

This invention relates to a lighting device for illuminating a display surface provided on a display surface side, and an electronic provided with a non-light emitting display device illuminated by a front light.

2. Description of Prior Art

A non-light emitting display device such as a liquid crystal display device which consumes less power, is small-sized and thin is indispensable as display means for an electronic. A liquid crystal display device is categorized into a transmission type and a reflection type. The transmission type liquid crystal display device is provided with a back light for illuminating a display surface from behind arranged on a back side of the liquid crystal display device. The reflection type liquid crystal display device is provided with a front light for illuminating a display surface from the front arranged on a display surface side of the liquid crystal display device. The front light has an advantage to the back light in that it can illuminate by using external light and consumes less power, and thus a variety of front lights have been developed for commercial uses. (See JP 10-311915, A and JP 10-153777, A)

FIG. 6 illustrates one example of an electronic provided with a reflection type liquid crystal display device having a front light. The electronic includes a PDA such as a mobile computer, a portable telephone, and an electronic still camera or the like. A body of the electronic 61 houses a reflection type liquid crystal panel 62. A front light 63 is provided on a display surface side of the liquid crystal panel 62. The front light 63 comprises a line-shaped light source 64 such as a cold cathode fluorescent lamp, a light guide plate 65 for illuminating the display surface of the liquid crystal panel 62 by introducing light from the light source 64 and transmitting external light, and a reflection preventive film 66 attached on a back surface of the light guide plate 65 for improving visibility.

A surface opposite to a surface of the light guide plate 65 facing to the liquid crystal panel 62 includes a first inclining surface 67 inclining to a surface provided with the light source 64 and a second inclining surface 68 inclining to an opposite surface to the surface provided with the light source 64. The first and second inclining surfaces 67, 68 are formed. A peak line and a valley line formed by the first inclining surface 67 and the second inclining surface 68 are formed alternately and parallel with each other. When regarding a plane including the valley line as a virtual plane, an angle β of the first inclining surface 67 to the virtual plane is far greater than an angle α of the second inclining surface 68 (See FIG. 7). For example, the angle β of the first inclining surface 67 is approx. 40–43°, the angle α of the second inclining surface 68 is approx. 2–5°. A projected area of the first inclining surface 67 to the virtual plane is far smaller than the projected area of the second inclining surface 68 (for example, 1:10–30).

The light guide plate 65 becomes thinner as it is farther from a surface for introducing light from the light source 64, and has a cross section of a wedge shape. A back surface of the light guide plate 65 (on the liquid crystal panel side) for attaching the reflection preventive film 66 is approximately flat.

Such the electronic has the light source 64 arranged on an upper side of the light guide plate 65 with respect to upper and lower directions of the body 61. In watching the liquid crystal panel 62 by utilizing external light 70, the external light 70 is incident from the upper direction of the body 61 to the light guide plate 65 and transmits the light guide plate 65 so that the liquid crystal panel 62 is illuminated. A viewer perceives a display of the liquid crystal panel 62 by looking to a direction of the light guide plate 65 and observing reflective light from the liquid crystal panel 62 through the light guide plate 65.

However, when observing the liquid crystal panel 62 by utilizing external light, parallax may be generated on a part of the display to be observed. As shown in FIG. 7, when the external light incident from an upper part of the electronic body 61 is reflected to the liquid crystal panel 62 after transmitting through the light guide plate 65 and transmits the light guide plate 65 again, more than two reflective light of a single image are perceived at a certain visual angle because inclining angles of the first and second inclining surfaces 67, 68 are different. For example, the reflective light of an image perceived by a viewer which transmits the second inclining surface 68 at a point A is observed at a position shifted from the point A to S1, and the reflective light perceived by the viewer which transmits the first inclining surface 67 is observed at a position shifted from the point A to S2. Therefore the two images shifted by S1+S2 are observed and the viewer perceives parallax. Reflective light of a single image except for a certain visual angle does not cause parallax because the reflective light is not perceived simultaneously by the viewer.

When parallax caused by a front light (or a light guide plate) is generated in the display to be observed, the display quality of the reflection type liquid crystal display device provided with the front light is degraded, causing a problem in practical use.

SUMMARY OF THE INVENTION

This invention was made to provide an electronic provided with a reflection type liquid crystal display device having a front light of good display performance in practical use by suppressing parallax on a display to be observed. The invention also provides a lighting device capable of suppressing parallax on a display to be observed, and a light guide plate to be used for the lighting device.

An electronic provided with a non-light emitting display device according to this invention comprises non-light emitting display means and a lighting device for illuminating a display surface provided on a display surface side of the non-light emitting device. The lighting device comprises a light source and a light guide plate including an incident surface for introducing light from the light source, an emitting surface for emitting incident light, and an opposite surface for transmitting external light and reflecting light incident from the incident surface facing to the emitting surface. The opposite surface of the light guide plate includes a first inclining surface inclining to the incident surface and a second inclining surface inclining to an opposite surface to the incident surface which are alternately formed. A peak line and a valley line parallel to each other are formed by the first inclining surface and the second inclining surface, and the second inclining surface for forming the valley line with the first inclining surface is positioned in an upper direction of the body of the electronic.

As described above, the opposite surface of the light guide plate includes a plurality of the first inclining surfaces inclining to an incident surface side and facing to the incident surface, and a plurality of the second inclining surfaces inclining to an opposite surface side to the incident surface and facing to the opposite surface to the incident surface. The second inclining surface for forming the valley line with the first second inclined surface is formed so as to face to an upper direction of the body of the electronic, and parallax in a normal use of the electronic is prevented.

When regarding a plane including the valley line as a virtual plane, a projected area of the second inclining surface to the virtual plane is larger than a projected area of the first inclining surface to the virtual plane.

An angle of the first inclining surface to the virtual plane may be 45–90° in this invention.

When regarding a plane including the valley line as a virtual plane, an angle of the first inclining surface to the virtual plane may be 45–90°, enabling the viewer to perceive sufficient illumination light quantity.

A light guide plate according to this invention is used for a lighting device for illuminating a display surface provided on a display surface side of a non-light emitting display device and comprises an incident surface for introducing light from a light source arranged by facing to the light source, an emitting surface for emitting incident light, and an opposite surface for reflecting the incident light from the incident surface and transmitting external light arranged oppositely to the emitting surface. The opposite surface includes a first inclining surface inclining to the incident surface and a second inclining surface inclining to an opposite surface to the incident surface which are alternately formed, a peak line and a valley line parallel to each other are formed by the first inclining surface and the second inclining surface. When regarding a plane including the valley line as a virtual plane, an projected area of the second inclining surface to the virtual plane is larger than a projected area of the first inclining surface to the virtual plane, and the first inclining surface has an angle of 45–90° to the virtual plane.

With this structure, a light guide plate capable of supplying sufficient illumination light quantity is provided.

A lighting device according to this invention comprises a light guide plate and a light source provided on an incident surface side of the light guide plate. The light guide plate includes an incident surface for introducing light from the light source arranged by facing to the light source, an emitting surface for emitting incident light, and an opposite surface for reflecting the incident light from the incident surface and transmitting external light. The opposite surface includes a first inclining surface inclining to the incident surface and a second inclining surface inclining to an opposite surface to the incident surface which are alternately formed. A peak line and a valley line parallel to each other are formed by the first inclining surface and the second inclining surface. And when regarding a plane including the valley line as a virtual plane, a projected area of the second inclining surface to the virtual plane is larger than a projected area of the first inclining surface to the virtual plane, and the first inclining surface has an angle of 45–90° to the virtual plane.

With the above structure, a bright display surface can be provided and a front light capable of illuminating sufficiently is provided.

The foregoing and other objects, features, aspects and advantages of the present invention will become more apparent from the following detailed description of the present invention when collected conjunction with the accompanying drawings.

DESCRIPTION OF THE PREFERRED EMBODIMENT(S)

Figure 1:
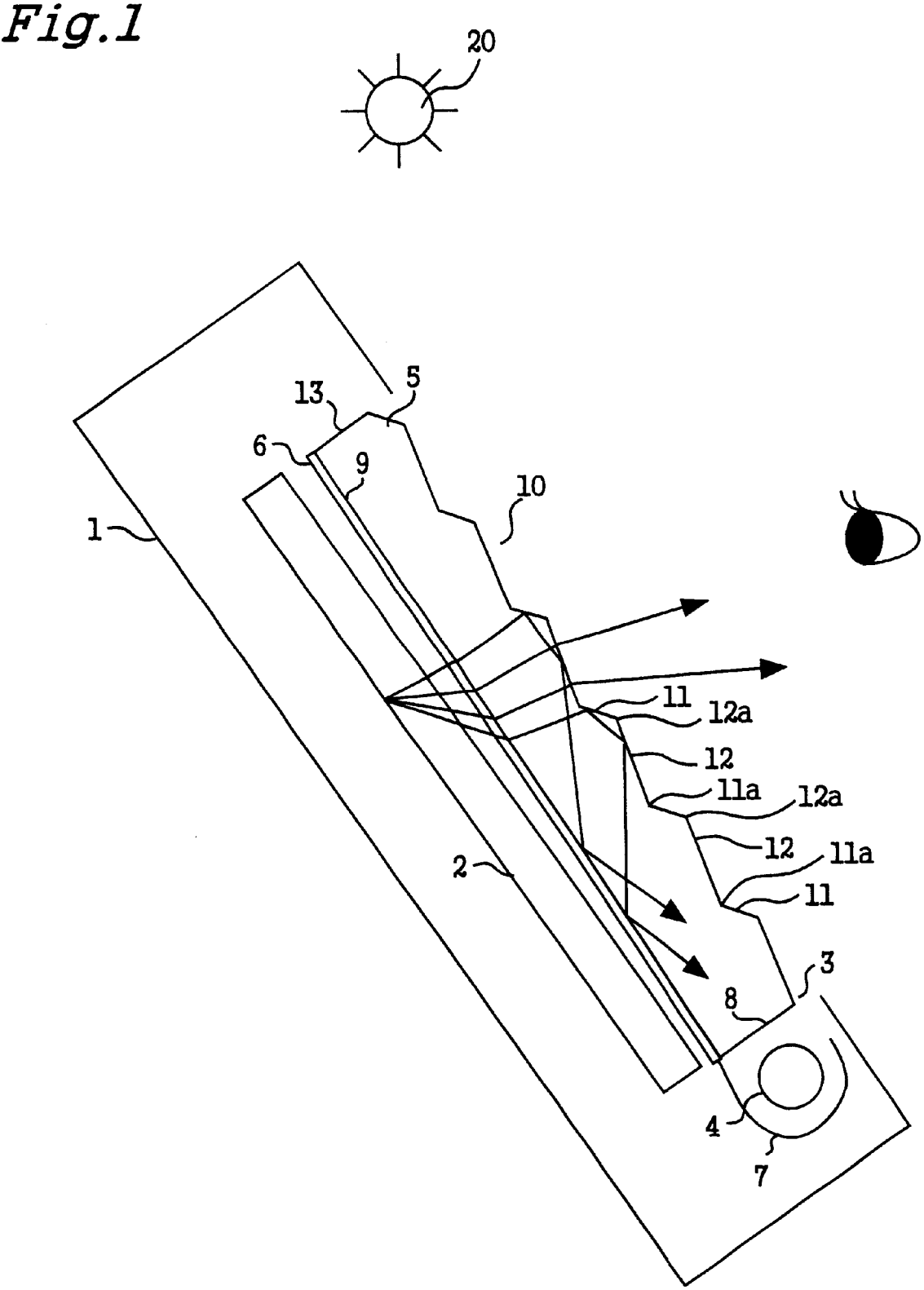
FIG. 1 is a schematic view illustrating one embodiment electronic provided with a non-light emitting display device according to this invention.

FIG. 1 is a schematic view illustrating one embodiment of an electronic provided with a non-light emitting display device according to this invention.

A body 1 of an electronic is such as a PDA such as a mobile computer, a portable telephone, and an electronic still camera. A reflection type liquid crystal display panel 2 as non-light emitting display means is housed in the body 1. A front light 3 as a lighting device is provided on a display surface side of the liquid crystal display panel 2. In this embodiment, the non-light emitting display device comprises the liquid display panel 2 and the front light 3.

The front light 3 comprises a line-shaped light source 4 such as a cold cathode fluorescent lamp, a light guide plate 5 for illuminating the display surface of the liquid display panel 2 by transmitting external light and introducing light from the light source 4 incident from an incident surface, a reflection preventive film 6 for improving visibility attached on a back surface of the light guide plate 5, and a reflector 7 for introducing light from the light source 4 to the incident surface of the light guide plate 5 with an inner surface of a white or silver foil reflecting surface provided around the light source 4. The light source may be a point light source such as an LED. In this case, a plurality of the point light sources are arranged to form a line shape and the point light sources are converted into a line shape.

The light guide plate 5 includes an incident surface 8 for introducing light from the light source 4 formed with a translucent material such as acrylic resin and facing to the light source 4, a back surface 9 as an emitting surface attached with a reflection preventive film 6 which is flat and faces to the liquid display panel 2, and an opposite surface 10 for transmitting external light and reflecting light from the light source 4 incident from the incident surface 8 arranged oppositely to the back surface 9. The opposite surface 10 includes a first inclining surface 11 inclining to an incident surface 8 and facing to the incident surface 8, and a second inclining surface 12 inclining to an opposite surface 13 to the incident surface 8 and facing to the opposite surface 13 opposite to the incident surface 8. A plurality of the first inclining surfaces 11 parallel to each other and a plurality of the second inclining surfaces 12 parallel to each other are alternately formed, and a peak line 12a and a valley line 11a are formed by sides of the first inclining surface 11 and the second inclining surface 12. The peak line 12a and valley line 11a are alternately formed and are parallel to each other.

Figure 2:
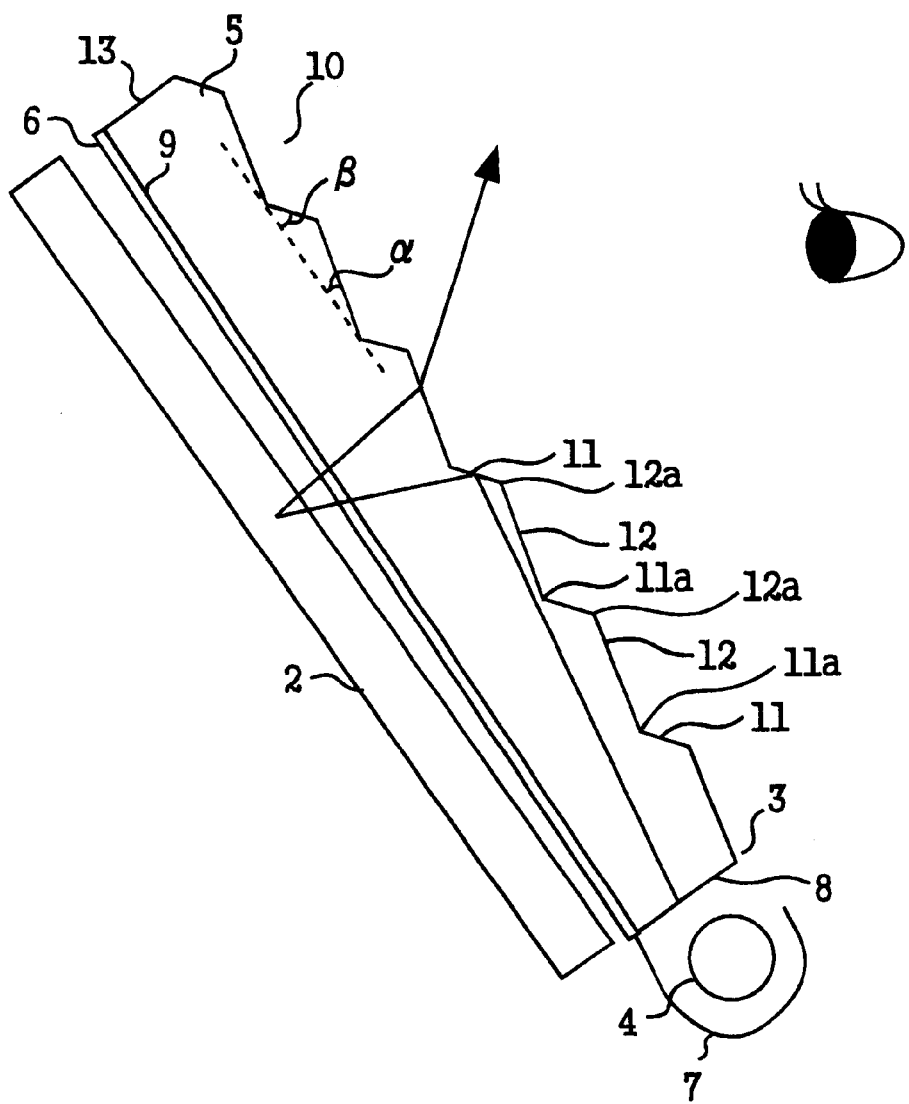
FIG. 2 is a typical view of illumination by a front light of FIG. 1.

When regarding a plane including the valley line 11a as a virtual plane, an inclining angle β of the first inclining surface 11 to the virtual plane is far greater than an inclining angle α of the second inclining surface 12 to the virtual plane (see FIG. 2). In this embodiment, the angle β is 43°, and the angle α is 2°. Therefore, a projected area of the first inclining surface 11 to the virtual plane is far smaller than a projected area of the second inclining surface 12 to the virtual plane. In this embodiment, the ratio of them are 1:27.

The distance between the virtual plane of the opposite surface 10 and the back surface 9 of the light guide plate 5 becomes smaller as farther from the incident surface 8. The light guide plate 5 is formed so as to be a wedge shaped cross section of which thickness is smaller as farther from the incident surface 8. For example, the thickness of the light guide plate 5 on the incident surface 8 side is approximately 1.2 mm, the thickness on the opposite surface 13 side opposite to the incident surface 8 is approximately 1 mm, and a distance between the valley line 11a and the peak line 12a is approximately 13 μm.

A light guide plate of such the shape is formed by injection molding using thermal plastic resin such as polycarbonate including acrylic resin. Even when the light guide plate includes the first and second inclining surfaces, it can be easily and integrally formed by a common forming process using a mold.

The second inclining surface 12 for forming each of the valley lines 11a with the first inclining surface 11 of the light guide plate 5 is arranged on an upper side of the body 1 in mounting on the body 1. Therefore, the light source 4 of the front light 3 is positioned on a lower side of the body 1 with respect to the light guide plate 5.

Explanation is made on a case that the front light 3 illuminates the display surface of the liquid crystal display panel 2. As shown in FIG. 2, when the light source 4 is turned on, light from the light source 4 is incident to the incident surface 8, is reflected to the first inclining surface 11, and is emitted from a back surface 9. The light is reflected on and transmits the light guide plate 5 because material (such as acrylic resin) of the light guide plate 5 has a critical angle to air. Light traveling with a smaller angle than the critical angle is refracted and transmits through surfaces, and light traveling with a greater angle than the critical angle is reflected. The light emitted from the back surface 9 illuminates the display surface of the liquid crystal panel 2 through the reflection preventive film 6. The reflected light to the display surface of the liquid crystal display panel 2 out of the illumination light is incident to the light guide plate 5 from the back surface 9 through the reflection preventive film 6, is emitted to the outside from the second inclining surface 12, and is perceived by the viewer. The light reflected on the second inclining surface 12 out of the light from the light source 4 is not emitted from the back surface 9. Only the light reflected on the first inclining surface 11 is emitted from the back surface 9 and illuminates the display surface of the liquid crystal panel 2. The light emitted from the opposite surface 10 side is only the light reflected to the display surface of the liquid crystal display panel 2 (this reflected light enters the light guide plate 5 again and emitted from the opposite surface 10 side) of the light reflected to the first inclining surface 11 out of the light emitted from the light source 4. Therefore, two reflected light of a single image are not perceived by the viewer and parallax is not generated when the light from the light source 4 illuminates the display surface.

Figure 7:
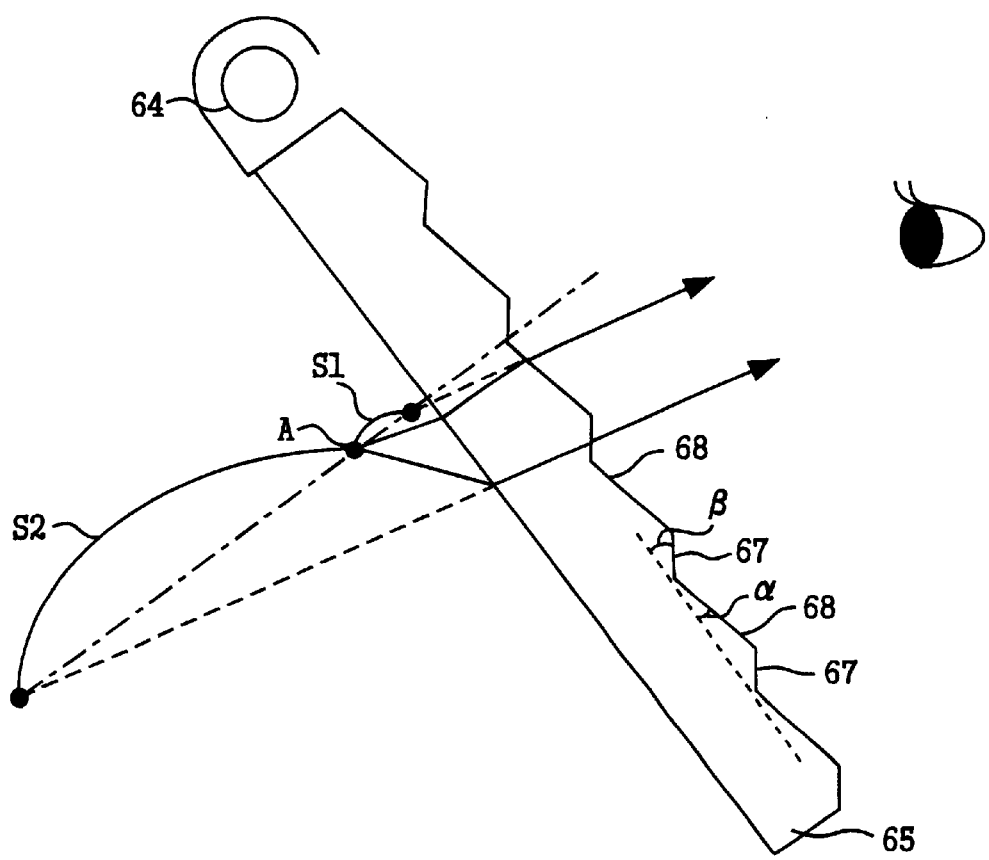
FIG. 7 is an explanatory view illustrating parallax in FIG. 6.

Explanation is made on illumination of the display surface of the liquid crystal display panel 2 by light from outside of the body. External light 20 such as sunlight and light from lighting apparatuses normally travels from an upper side of the body 1 of the electronic, and is incident to the light guide plate 5 from the second inclining surface 12 and the first inclining surface 11. In view point of dimension, most of light is incident from the second inclining surface 12. As shown in FIG. 1, the external light 20 incident to the light guide plate 5 is emitted from the back surface 9 through the light guide plate 5, and illuminates the display surface of the liquid crystal display panel 2 through the reflection preventive film 6. As described above, the reflected light on the display surface of the liquid crystal display panel 2 enters the light guide plate 5 from the back surface 9 through the reflection preventive film 6, and is emitted from the second inclining surface 12 to the outside and is perceived by the viewer. The light traveling to the second inclining surface 12 out of the reflected light incident from the back surface 9 transmits the second inclining surface 12, and the light traveling to the first inclining surface 11 is reflected and is not emitted from the first inclining surface 1. Therefore, at a certain visual angle, the viewer does not perceive two reflective light to the single image (A) as shown in FIG. 7, and parallax is not generated.

In this invention, when the viewer watches the display surface of the electronic in a normal situation such as the external light travels from the upper direction of the viewer's visual angle and the viewer looks at the display surface from the exact front or looks down the screen, parallax does not little occur. However, when the external light comes from directions near or lower of extension of the viewer's visual angle, parallax may occur. However, such the situation would not occur in a normal situation and parallax occurs in a rare situation in normal use of the electronic.

When illuminating the display surface of the liquid crystal display panel 2 by the front light 3 as shown in FIG. 2, the reflective light from the light guide plate 5 is emitted to the upper direction of the body 1 of the electronic. Therefore, the reflective light may not be introduced in a range of the visual angle of the viewer depending on a visual angle position of the viewer (particularly when the viewer is exact opposite to the inclining display surface). In this case, illumination light quantity is little for the viewer and the illumination effect by the front light can not be obtained.

When the front light 3 is provided with the electronic used in such the situation, the light guide plate 5 is formed so that the inclining angle β of the first inclining surface 11 is 45° to the virtual plane. In such the structure, when light from the light source 4 reflects on the first inclining surface 11, the light is reflected to the direction for returning to the light source 4, and the reflected light from the display surface of the liquid crystal panel 2 is emitted to the opposite side to as shown in FIG. 2 (the lower direction of the body 1). Therefore, the reflected light enters the visual angle of the viewer even when the viewer is exact opposite to the inclined display surface. Thus, the viewer can perceive sufficient illumination light quantity, and can watch the bright display surface, and illumination effect by the front light can be obtained.

Figure 3:
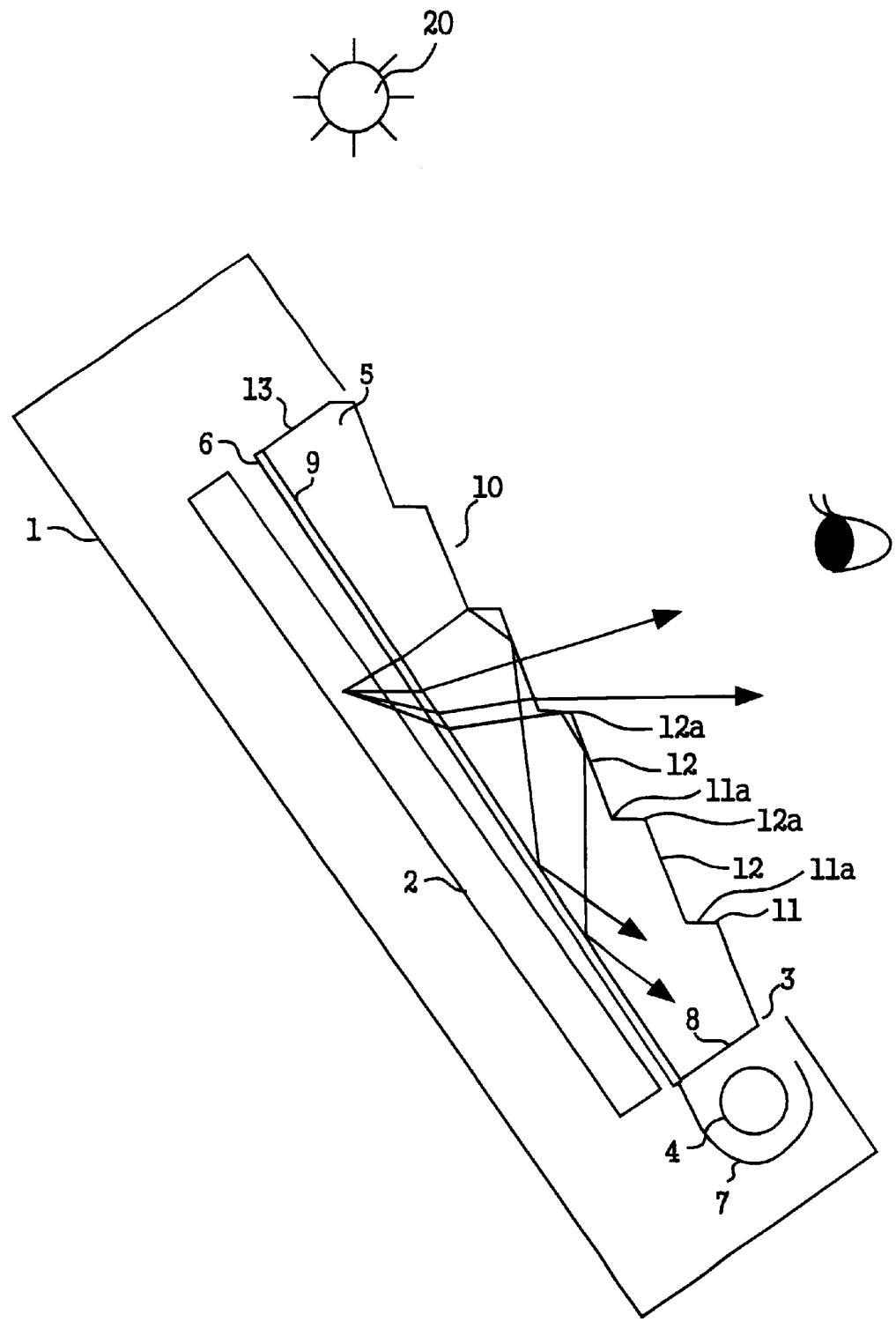
FIG. 3 is a schematic view illustrating another embodiment of an electronic provided with a non-light emitting display device according to this invention.
Figure 4:
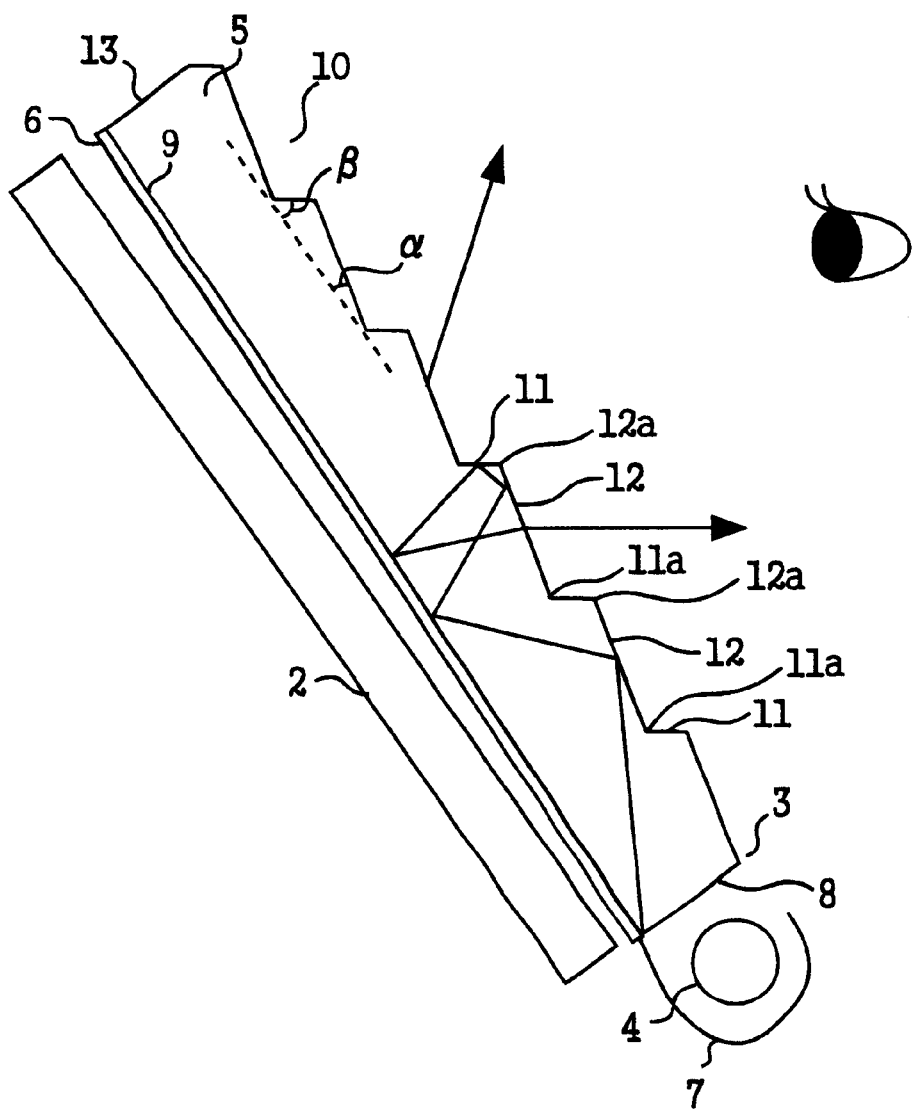
FIG. 4 is a typical view of illumination by the front light of FIG. 3.

In the embodiment shown in FIG. 4, the inclining angle, β is 45°. The inclining angle β of the first inclining surface 11 to the virtual plane may be from 45° to 90° to obtain the same effect. In this case, the inclining angle β is preferably from 45° to 70° since the light transmitting through the first inclining surface 11 increases and light for utilizing as illuminating light decreases when the inclining angle β becomes large. As shown in FIG. 3, in the embodiment in FIG. 4, little external light is emitted from the first inclining surface. Therefore, parallax may not occur as in the embodiment shown in FIG. 1.

Figure 5:
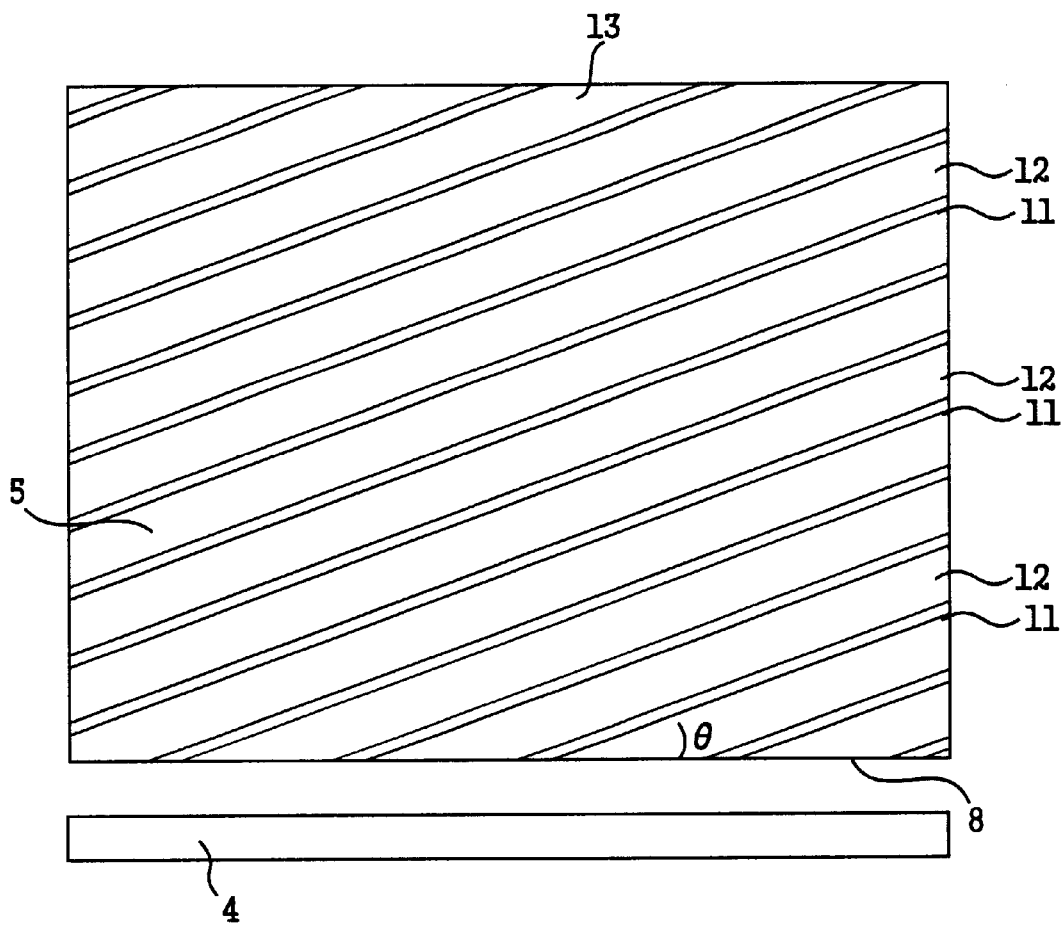
FIG. 5 is a top view illustrating how the front light according to the invention is used.
Figure 6:
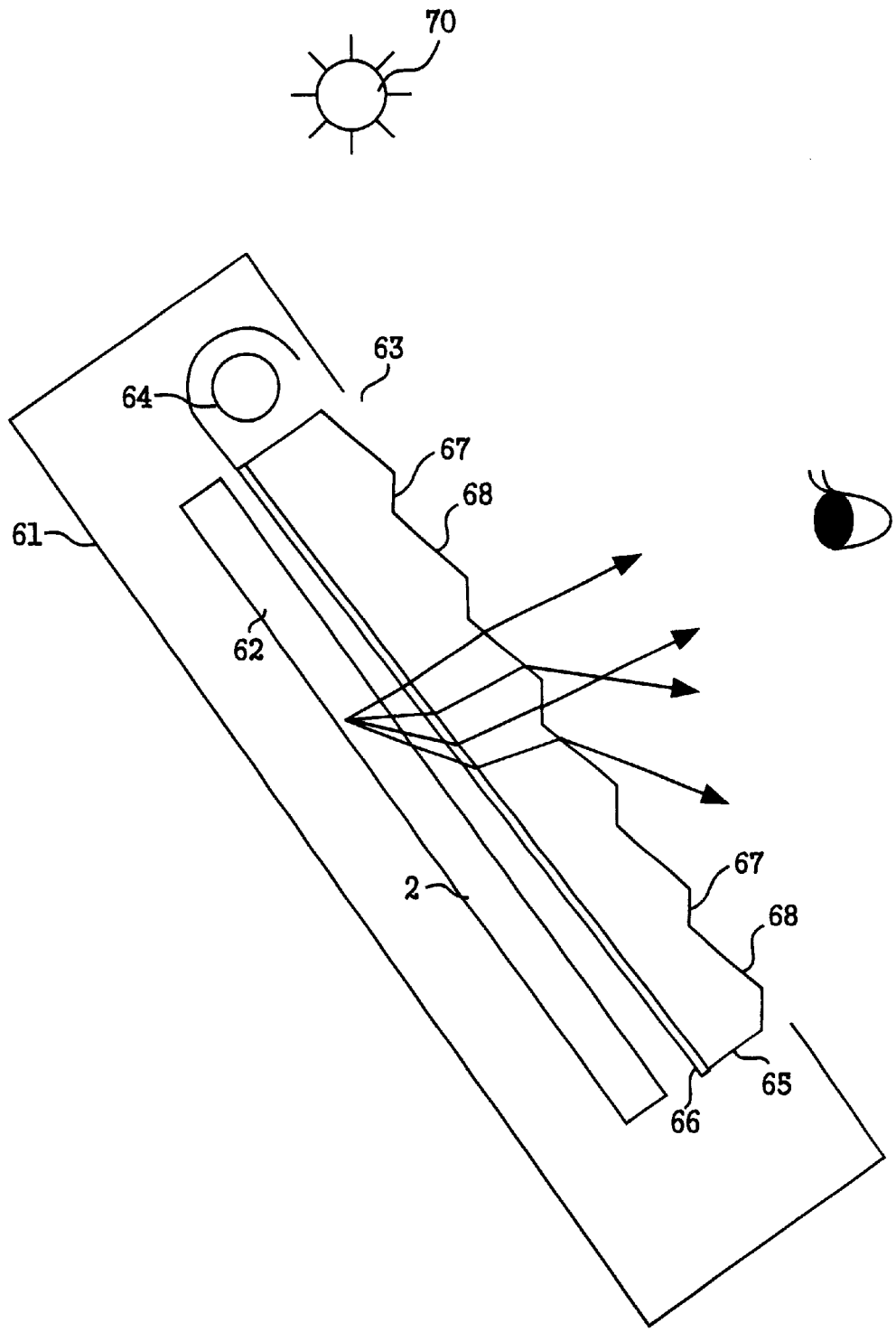
FIG. 6 is a schematic view illustrating one example of a conventional electronic provided with a reflection type liquid crystal display device having a front light.

In this embodiment, the valley line 11a and the peak line 12a are parallel to the incident surface 8 for simplified explanations. As shown in FIG. 5, the valley line 11a and the peak line 12a may be formed to have a predetermined angle θ (θ is approximately 5–25°) to the incident surface 8.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. An electronic provided with a non-light emitting display device comprising a non-light emitting display device housed in a body of the electronic, and a lighting device for illuminating a display surface provided on a display surface side of the non-light emitting device, wherein the lighting device comprises a light source and a light guide plate including an incident surface for introducing light from the light source, an emitting surface for emitting incident light, and an opposite surface for transmitting external light and reflecting light incident from the incident surface facing to the emitting surface, and the opposite surface includes a first inclining surface inclining to the incident surface and a second inclining surface inclining to an opposite surface to the incident surface which are alternately formed, a peak line and a valley line parallel to each other are formed by the first inclining surface and the second inclining surface, and the second inclining surface for forming the valley line with the first inclining surface is positioned in an upper direction of the body of the electronic.

2. The electronic provided with the non-light emitting display device according to claim 1, wherein when regarding a plane including the valley line as a virtual plane, a projected area of the second inclining surface to the virtual plane is larger than a projected area of the first inclining surface to the virtual plane.

3. The electronic provided with the non-light emitting display device according to claim 2, wherein the first inclining surface has an angle 45–90° to the virtual plane.

4. A light guide plate used for a lighting device for illuminating a display surface provided on a display surface side of a non-light emitting display device comprising, an incident surface for introducing light from a light source arranged by facing to the light source, an emitting surface for emitting incident light, and an opposite surface for reflecting the incident light from the incident surface and transmitting external light arranged oppositely to the emitting surface, wherein the opposite surface includes a first inclining surface inclining to the incident surface and a second inclining surface inclining to an opposite surface to the incident surface which are alternately formed, a peak line and a valley line parallel to each other are formed by the first inclining surface and the second inclining surface, and further when regarding a plane including the valley line as a virtual plane, an projected area of the second inclining surface to the virtual plane is larger than a projected area of the first inclining surface to the virtual plane, and the first inclining surface has an angle of 45–90° to the virtual plane.

5. A lighting device for illuminating a display surface provided on a display surface side of a non-light emitting display device comprising a light guide plate and a light source provided on an incident surface side of the light guide plate, wherein the light guide plate includes an incident surface for introducing light from the light source arranged by facing to the light source, an emitting surface for emitting incident light, and an opposite surface for reflecting the incident light from the incident surface and transmitting external light, and the opposite surface includes a first inclining surface inclining to the incident surface and a second inclining surface inclining to an opposite surface to the incident surface which are alternately formed, a peak line and a valley line parallel to each other are formed by the first inclining surface and the second inclining surface, further when regarding a plane including the valley line as a virtual plane, a projected area of the second inclining surface to the virtual plane is larger than a projected area of the first inclining surface to the virtual plane, and the first inclining surface has an angle of 45–90° to the virtual plane.

* * * * *

UNITED STATES PATENT AND TRADEMARK OFFICE
CERTIFICATE OF CORRECTION

| | | |
|---|---|---|
| PATENT NO. | : 6,341,872 B1 | Page 1 of 1 |
| APPLICATION NO. | : 09/645873 | |
| DATED | : January 29, 2002 | |
| INVENTOR(S) | : Youichiro Goto | |

It is certified that error appears in the above-identified patent and that said Letters Patent is hereby corrected as shown below:

On the title page, under Foreign Application Priority Data:

Change "Aug. 25, 2000" to -- Aug. 25, 1999 --.

Signed and Sealed this

Twenty-second Day of September, 2009

David J. Kappos
*Director of the United States Patent and Trademark Office*